Patented Mar. 20, 1923.

1,449,112

UNITED STATES PATENT OFFICE.

FRIEDRICH HAYDUCK, OF WILMERSDORF, GERMANY, ASSIGNOR TO THE FLEISCH-MANN COMPANY, OF NEW YORK, N. Y., A CORPORATION OF OHIO.

LOW-ALCOHOL YEAST PROCESS.

No Drawing. Application filed October 30, 1920. Serial No. 420,839.

(GRANTED UNDER THE PROVISIONS OF THE ACT OF MARCH 3, 1921, 41 STAT. L., 1313.)

*To all whom it may concern:*

Be it known that I, FRIEDRICH HAYDUCK, a citizen of Germany, residing at Wilmersdorf, Germany, have invented certain new and useful Improvements in Low-Alcohol Yeast Processes (for which application for patent was filed in Germany May 7, 1915, Patent No. 303,253), of which the following is a specification.

This invention relates to a process for the manufacture of yeast and more particularly to a so-called continuous process in which a nutrient solution is fed to a suspension of yeast, whereby yeast, such as compressed baker's yeast, may be grown with the production of comparatively little alcohol.

An object of this invention is to provide an improved procedure for the commercial production of yeast in a convenient and economical manner, provision being made to avoid infection.

In my co-pending applications, Serial Nos. 420,832 and 420,833, filed October 30, 1920, which correspond respectively, to German Patents Nos. 300,662 and 303,222, processes are disclosed wherein the seed yeast is suspended either in water or in a dilute nutrient solution, for example about 1° Balling, which is aerated and to which a yeast nutrient solution is substantially continuously added at a rate such that all of the yeast nutrients, and substantially all of the alcohol which may be formed are assimilated by the yeast.

The worts which may be used in these processes may be of any type suitable for yeast propagation, as for example, the usual 12° Balling wort referred to in my first mentioned co-pending application No. 420,832 or the artificially prepared yeast nutrient solution comprising essentially sugar material and yeast nourishing inorganic salts, wherein sugar is present to an amount of approximately 10% and the yeast nutrient salts may be present to an amount of one-half the sugar content, as described in my co-pending application Serial No. 420,833. As an example of the last mentioned nutrient solution, the following is given:

Sugar 100 parts, ammonium sulphates 40 parts, acid potassium phosphates 9 parts, magnesium sulphate 1 part, calcium carbonate for neutralization, about 30 parts; or Molasses (containing 50% sugar) 100 parts, ammonium sulphate 10 parts, superphosphate (having 18% water soluble phosphoric acid) 10 parts, magnesium sulphate 0.5 parts, calcium carbonate for neutralization, about 4 parts.

One of the advantages gained in the carrying out of these processes is that the yeast can assimilate many substances immediately upon their being added or upon their being set free, including those which would not be so assimilated in a propagating liquid of higher concentration, as for example any alcohol which may be produced. However, in assimilating the alcohol the yeast loses some of its resistance to infection.

As is shown by my above mentioned co-pending application No. 430,833 the propagation is protected from undesirable infection by the maintenance of a slightly acid condition in the propagating liquid. This result is achieved in the said process by the partial neutralization of the acid or acids set free from the inorganic salts (for example ammonium sulphate, potassium sulphate, etc.,) by the yeast, during the period of propagation. This mode of procedure encounters difficulties, however, when the yeast is grown in metal vats, for the reason that the metal is acted upon by the acids to a certain extent, forming salts which tend to impair the growth and quality of the yeast.

I have now ascertained that the possibility of sufficient protection to the yeast under all conditions is offered in the use of the above mentioned processes of gradual addition if one adds certain antiseptics to the nutrient solution being supplied to the yeast. Although such antiseptics are usually considered to be very toxic to the yeast, nevertheless they do not injure the yeast for the reason that they are added gradually together with the nutrient solution and as a consequence not only are they always maintained at a concentration which is not injurious to the yeast, but are assimilated by the yeast. As an example of antiseptics which it has been found possible to use, formaldehyde, formic acid, etc., are given.

The step of adding "formalin" (formaldehyde solution) or formic acid to fermenting mashes, in order to keep the fermentation pure, is known. However, in such cases the amount of added antiseptic must be kept very low, as otherwise an injurious action would be exerted on the yeast. Furthermore, with this addition the concentration is too high to allow of the assimilation of either the antiseptics or the alcohol which may be produced.

In contrast to this the process of the present invention allows of the addition of a proportionately very much higher quantity of the above mentioned antiseptics to the concentrated yeast nutrient liquid, thus assuring a good sterilization of the concentrated liquid prior to the time at which it is added to the propagating liquid. Therefore, upon the gradual addition of the concentrated liquid containing the relatively large amount of antiseptic to the dilute propagating liquid, the concentration of the antiseptic is reduced not only in a purely mechanical manner but also by the assimilation thereof by the yeast.

As examples of the quantities of the above mentioned antiseptics which may be used, the following are given:

Formaldehyde 0.01% to 0.1%
Formic acid 0.03% to 0.3% calculated relative to the total liquid to be used and the selection of the particular concentration is dependent upon the degree of infection.

Having described my invention what I claim as new and desire to secure by Letters Patent is:

1. A process of propagating yeast which comprises initiating propagation of yeast with aeration in a dilute nutrient solution, and during the period of propagation substantially continuously adding an antiseptic at a rate such that the antiseptic is assimilated by the yeast.

2. A process of propagating yeast which comprises initiating propagation of yeast with aeration in a dilute nutrient solution, and substantially continuously adding during the period of propagation a solution containing all essential yeast nutrients and an antiseptic.

3. A process of propagating yeast which comprises preparing a nutrient solution containing all essential yeast nutrients, initiating propagation of yeast with aeration in a diluted portion of the said nutrient solution, adding an antiseptic to the remaining portion of the concentrated wort to sterilize the same, and during the period of propagation substantially continuously adding the sterilized concentrated portion to the dilute portion in which the yeast is propagated.

4. A process of propagating yeast which comprises preparing a nutrient solution containing all essential yeast nutrients, initiating propagation of yeast with aeration in a diluted portion of the said nutrient solution, adding an antiseptic to the remaining portion of the concentrated wort to sterilize the same, and during the period of propagation substantially continuously adding the sterilized concentrated portion to the dilute portion in which the yeast is propagated, at a rate such as to permit assimilation of the antiseptic by the yeast.

5. A process of propagating yeast which comprises preparing a nutrient solution containing all essential yeast nutrients, initiating propagation of yeast with aeration in a diluted portion of said nutrient solution, adding an antiseptic to the remaining portion of the concentrated wort to sterilize the same, and during the period of propagation substantially continuously adding the sterilized concentrated portion to the dilute portion in which the yeast is propagated, the concentration of the nutrient solution, the amount of antiseptic added to the concentrated portion, and the rate of addition of the sterilized concentrated portion to the dilute portion being such that substantially all of the antiseptic will be assimilated by the yeast.

6. A process of propagating yeast with a relatively low yield of alcohol which comprises preparing a nutrient solution containing all essential yeast nutrients, initiating propagation of yeast with aeration in a diluted portion of said nutrient solution, adding an antiseptic to the remaining portion of the concentrated wort to sterilize the same, and during the period of propagation substantially continuously adding the sterilized concentrated portion to the dilute portion in which the yeast is propagated, at a rate such that the concentration of the propagating liquid does not rise above that at which the antiseptic and substantially all of the alcohol which may be formed will be assimilated by the yeast.

7. A process of propagating yeast which comprises preparing a nutrient solution containing essentially sugar material and yeast nourishing inorganic salts, initiating propagation of yeast with aeration in a diluted portion of said nutrient solution, adding an antiseptic to the remaining portion of the concentrated wort to sterilize the same, and during the period of propagation substantially continuously adding the sterilized concentrated portion to the dilute portion in which the yeast is propagated.

In testimony whereof, I have affixed my signature.

FRIEDRICH HAYDUCK.